Oct. 4, 1966 D. M. GOODMAN 3,277,235

WIDE BAND AND COLOR CATHODE RAY TUBES AND SYSTEMS

Original Filed March 20, 1959 4 Sheets-Sheet 1

INVENTOR.
DAVID M. GOODMAN
BY A. J. Nydick
ATTORNEY

WIDE BAND AND COLOR CATHODE RAY TUBES AND SYSTEMS

Original Filed March 20, 1959

INVENTOR.
DAVID M. GOODMAN

BY [signature]

ATTORNEY

INVENTOR.
DAVID M. GOODMAN
BY
[signature]
ATTORNEY

WIDE BAND AND COLOR CATHODE RAY TUBES AND SYSTEMS

Original Filed March 20, 1959 4 Sheets-Sheet 4

INVENTOR.
DAVID M. GOODMAN
BY [signature]
ATTORNEY

United States Patent Office 3,277,235

Patented Oct. 4, 1966

3,277,235

WIDE BAND AND COLOR CATHODE RAY TUBES AND SYSTEMS

David M. Goodman, 3843 Debra Court, Seaford, N.Y.

Original application Mar. 20, 1959, Ser. No. 800,854, now Patent No. 3,081,414, dated Mar. 12, 1963. Divided and this application Feb. 8, 1963, Ser. No. 257,335

20 Claims. (Cl. 178—5.4)

This invention relates to directed ray tubes and systems that utilize electro-magnetic index signals to indicate the position or intensity of the directed rays in such tubes. More specifically, this invention relates to cathode ray tubes and systems that may be used in color television. This application is a division of my co-pending application, Serial No. 800,854, filed March 20, 1959, now U.S. Patent 3,081,414.

In general, in television systems an image to be presented is produced by scanning an electron beam in a raster pattern across a target screen and by controlling the intensity of excitation of the target screen. The raster pattern usually is rectangular in shape. It is known that, in systems of the type under consideration, controlling the electron beam shape and size, and its horizontal sweep, is often times advantageous. It has been attempted thereby to achieve color registration and purity.

One of the objects of this invention is to present additional novel methods and techniques, especially for use in color television, that provide a degree of control of the electron beam not heretofore attainable. This invention achieves this control by shaping the electron beam and suitably delaying the sweep of the electron beam across a target screen as a function of the intensity modulation imparted to the beam. The electro-magnetic index signals, generated as a consequence of bombardment of the target screen by the controlled beam, then are manipulated to provide numerous improvements in circuit operation.

Another object is to provide new modulation techniques for use with cathode ray tubes.

Another object is to provide a cathode ray tube with special features which increase the maximum modulation rates which may be applied to the tube.

Further advantages and objectives will become clear from the specification and the drawing wherein.

Figure 2:
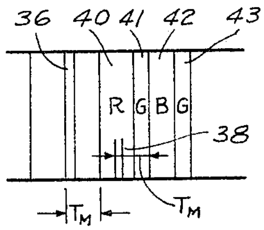
FIGURE 2 represents a target screen configuration that may be used in the tube of FIGURE 1.
Figure 2A:
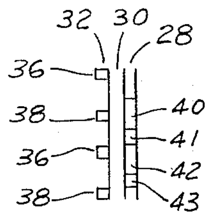

FIGURE 2*a* illustrates a cross sectional view of the target screen of FIGURE 2.

Figure 2B:
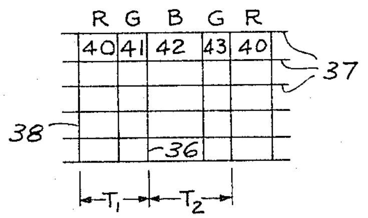

FIGURE 2*b* illustrates a mesh-like structure that may be used as a target screen.

Figure 1:
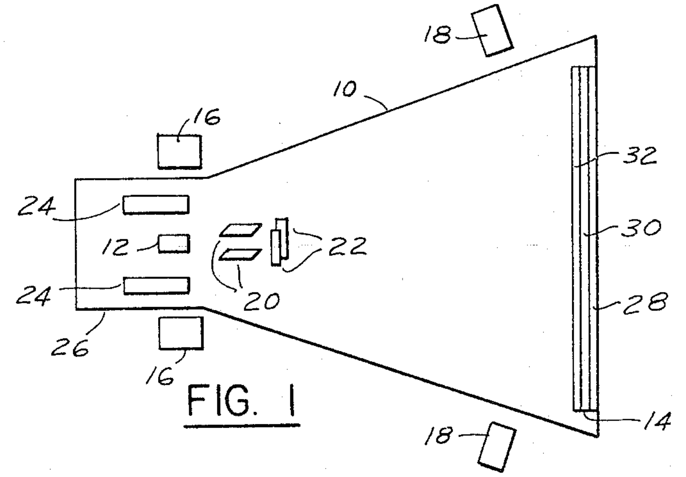
FIGURE 1 represents a cathode ray tube with a target screen, beam indexing means, and a plurality of radiation detectors. The tube also contains special shaping electrodes which are shown schematically.
Figure 3:
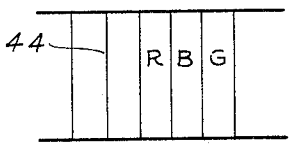

FIGURE 3 represents another target screen configuration that may be used in the tube of FIGURE 1.

Figure 3A:
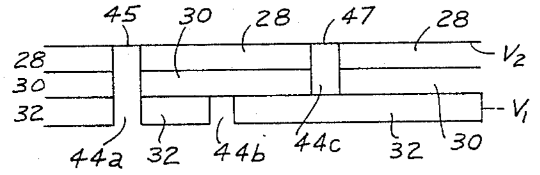

FIGURE 3*a* illustrates a cross sectional view of the target screen of FIGURE 3 with three different arrangements for generating index signals.

Figure 4:
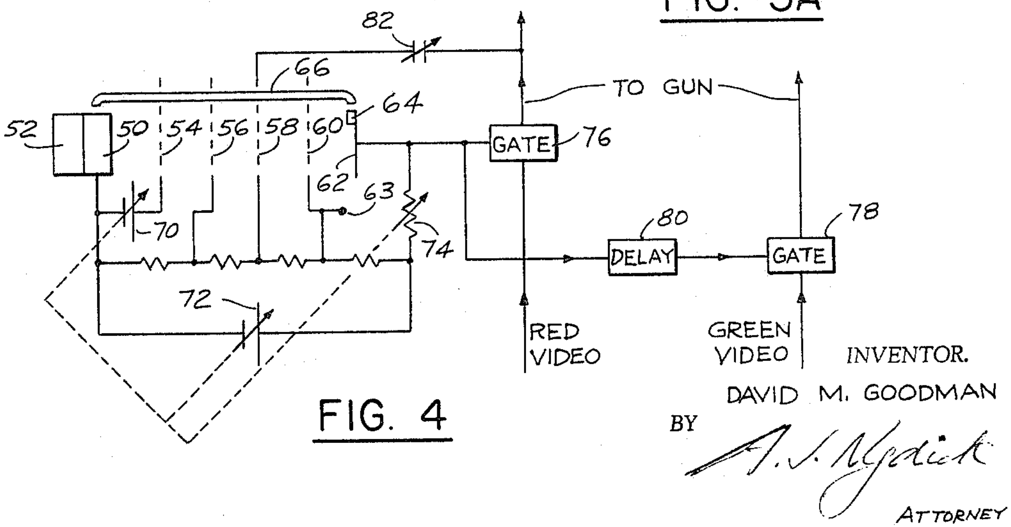

FIGURE 4 represents one channel of a system embodying a pulse generator, responsive to an indexing radiation from the target screen of a tube, which is used to control the modulation of the electron beam generated in the tube.

Figure 5:
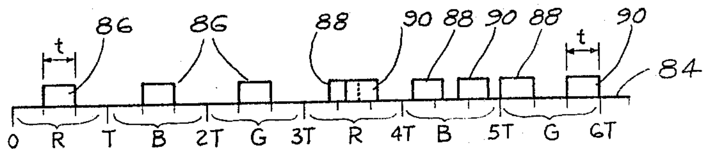

FIGURE 5 represents an idealized excitation of the target screen of FIGURE 3 when the electron beam is scanned linearly from 0 to 3T and non-linearly from 3T to 6T.

Figure 6:
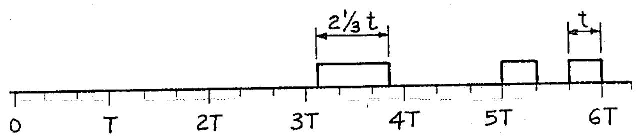

FIGURE 6 represents another idealized excitation of the target screen of FIGURE 3 by the electron beam wherein pulses of different size or duration are used.

Figure 7:
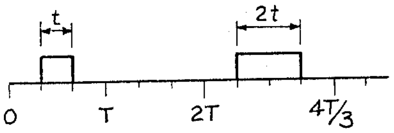

FIGURE 7 represents still another idealized excitation a target screen, with the last strip being of increased dimension and the pulse being of different size or duration.

Figure 8:
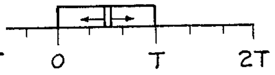

FIGURE 8 represents the idealized excitation of one strip of a target screen wherein the period of excitation is modulated in time as a function of amplitude of the signal to be displayed.

Figure 9:
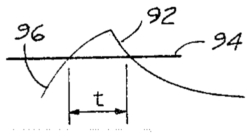

FIGURE 9 represents an electrical pulse signal with exponential-like rise and decay.

Figure 10:
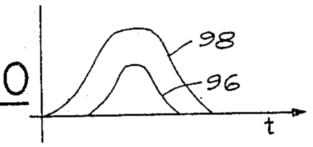

FIGURE 10 illustrates bell-shaped curves representative of the effects an electron beam have upon an indexing strip.

Figure 11:
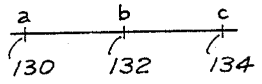

FIGURE 11 represents an indexing feature of a target screen akin to that of FIGURE 3.

Figure 12:
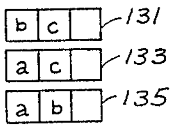

FIGURE 12 represents a filter-detector combinations suitably responsive to indexing radiation from the screen of FIGURE 11.

Figure 13:
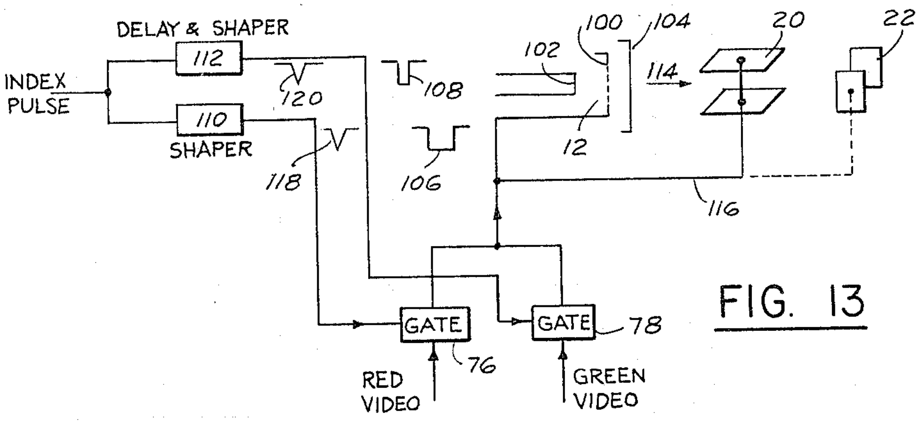

FIGURE 13 illustrates a method of controlling the scanning velocity, shape, and amplitude of an electron beam as a function of video modulation.

Figure 13A:
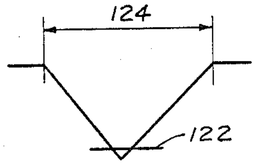

FIGURE 13*a* illustrates a waveform that may be used in the arrangement of FIGURE 13 to control the period of excitation of the electron beam as a function of video modulation.

Figure 14:
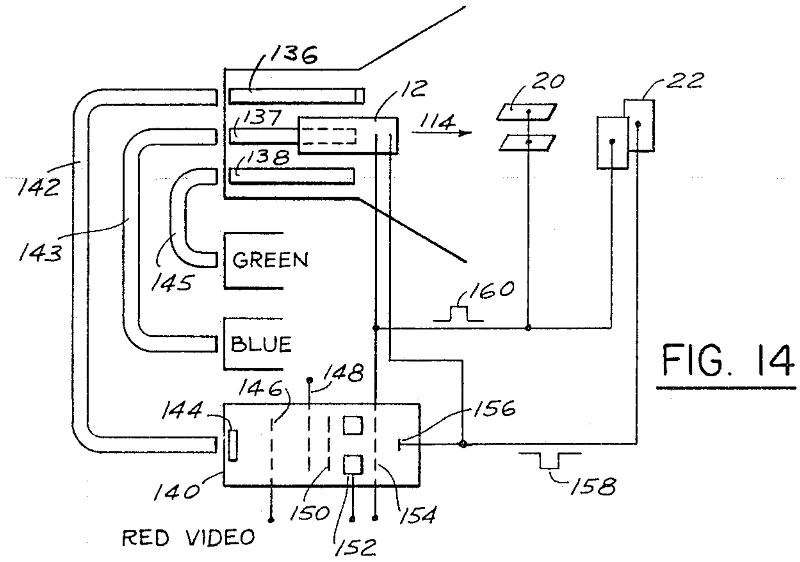

FIGURE 14 illustrates a minimum time delay system embodying three grid-controlled photo-multiplier tubes driving a three color single gun cathode ray tube.

Figure 15:
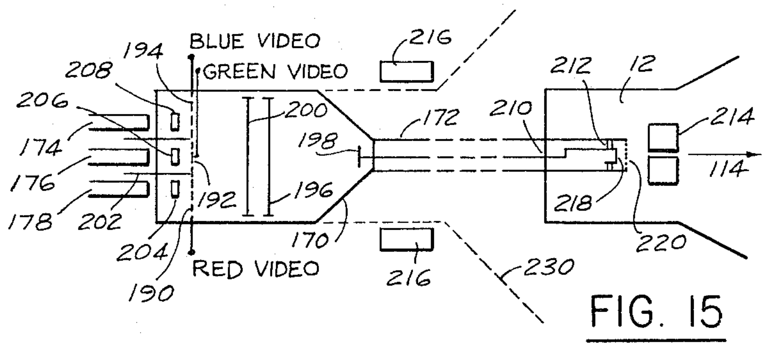

FIGURE 15 illustrates a special photo-multiplier tube, with three inputs, three control grids, and a single coaxial line output which feeds the gun of a special cathode ray tube.

Figure 16:
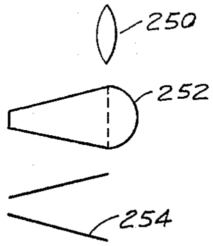

FIGURE 16 illustrates a plurality of electro-magnetic radiation gatherers and transmitters.

Figure 17:
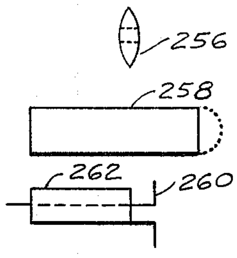

FIGURE 17 illustrates further electro-magnetic radiation gatherers and transmitters.

Figure 18:
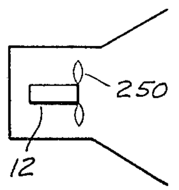

FIGURE 18 represents the neck section of a cathode ray tube with a plurality of lenses affixed to the electron gun structure.

Figures 19, 20:
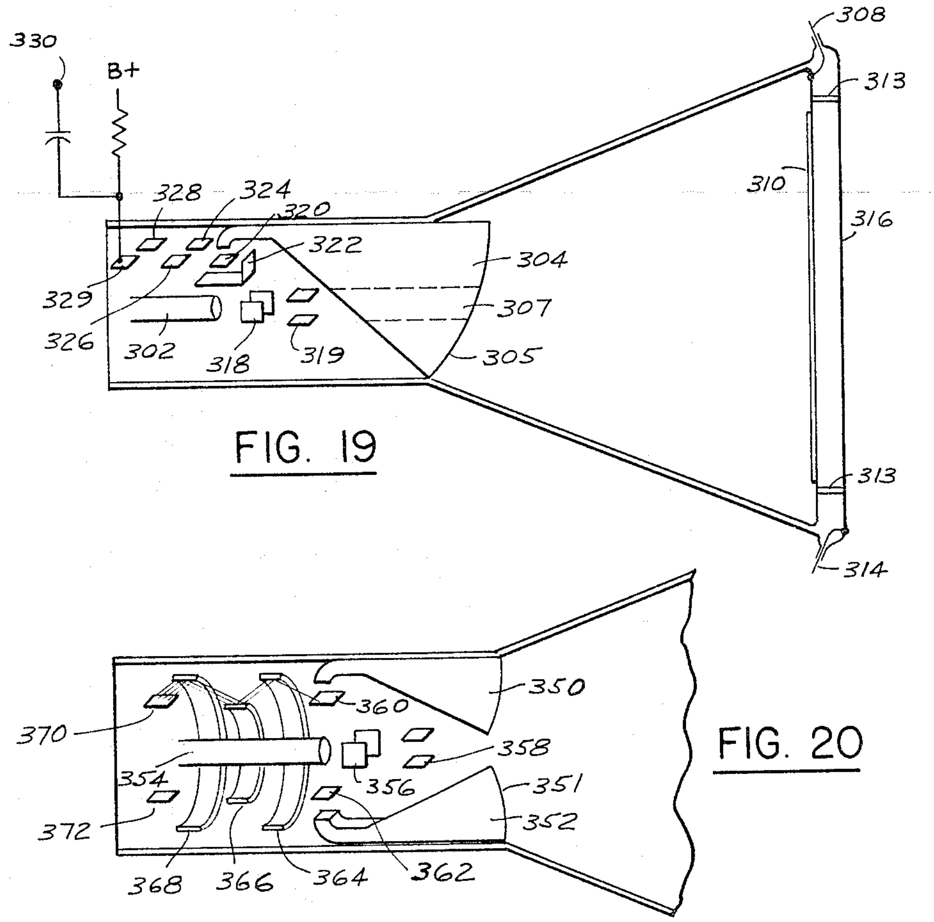

FIGURE 19 represents a cathode ray tube with a target screen for generating X-radiation and with detection means for converting the X-radiation into electrical signals.

FIGURE 20 represents a cathode ray tube with two detectors responsive to two different electro-magnetic radiations.

Figure 21:
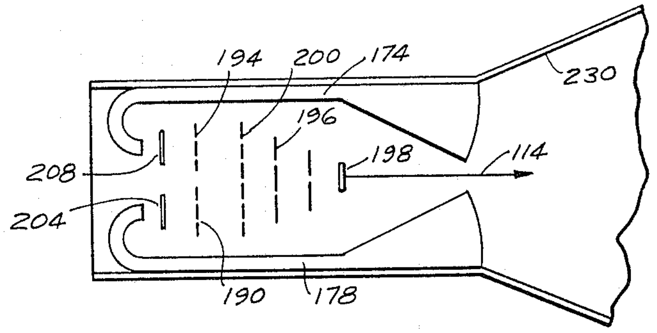

FIGURE 21 represents a cathode ray tube in which the electron beam is furnished by the last stage of a secondary emission electron multiplier.

This invention, it will be shown, provides novel cathode ray tubes, target screens, beam indexing means comprised of electromagnetic radiation generators and detectors, pulse generators, and video modulators, interconnected with circuit means in various arrangements that provide color television receiver systems. The manner in which these systems operate will be understood from the following specification taken in conjunction with the drawing.

In FIGURE 1, there is shown a cathode ray tube envelope 10 containing an electron beam forming member 12. Target screen assembly 14 is scanned by the electron beam furnished by member 12. Coils 16 conventionally provide the vertical and horizontal scanning action. Two radiation detectors 18 are shown located external of the tube. They are X-ray responsive and are disposed substantially parallel to and near the plane of the target screen assembly 14. Vernier vertical deflection plates 20, and vernier horizontal deflection plates 22 are disposed to control the electron beam as hereinafter set forth. Two radiation detectors 24 are shown disposed within the neck portion 26 of the cathode ray tube. Detectors 24 may be used with detectors 18, depending upon the total number of indexing signals being generated as will become clear. Thus, means 18 are shown positioned outside the cathode ray tube and means 24 are shown within the tube to detect the electro-magnetic index signals. Means 18 may be comprised of suitably responsive photo-multipliers such as the RCA 931A; means 24 may be comprised of the elements of which the 931A consists. Alternatively, the arrangements of FIGURE 19 may be used when one detector is required, and that of FIGURE 20 may be used when a plurality of detectors are required. The target screen assembly 14 consists of members 28, 30, and 32. Member 28 in one embodiment, is comprised of phosphors or other visible radiation emitting materials arranged in narrow strips which are positioned lengthwise in the vertical direction. The horizontal scanning of these strips takes place substantially perpendicular to the thus designated vertical direction. Member 30 is an electron-transparent light-reflecting aluminum layer. Member 32 consists of strips that provide electro-magnetic index radiation when bombarded by the scanning beam of electrons. Depending upon the materials that these strips are made of, the electro-magnetic index radiation may extend from waves of infra-red to X-rays. When this indexing radiation is in the X-ray region, members 30 and 32 may be interchanged, as will be explained infra. In FIGURE 3*a* a target assembly is shown which is capable of generating index signals in the Hertzian range.

*Target screens*

FIGURE 2 shows, on an enlarged scale of front view of one possible arrangement of layer 28 of target screen assembly 14. Red, green, and blue color producing phosphors are arranged in the sequence red-green, blue-green and are designated 40–41, 42–43. The dimensions of the phosphor strips that are selected for this purpose are such that when the horizontal scanning beam, which proceeds linearly from left to right across FIGURE 2, is constant in intensity, a substantial white image is presented to the observer. This is achieved by having the widths of the strips in the path of scan inversely proportional to the luminous efficiencies of the color producing phosphors. Phosphors are presently available which are more efficient in the green than in the blue, which is more efficient than the red. Therefore the red strip is widest, the blue strip is narrower, and the sum of the two green strips is narrowest. The efficiencies stated are those which apply when a human being is the observer. The screen strip is divided as shown since the visual acuity of the eye is greatest in the green region of the spectrum. For detectors other than the eye similar considerations prevail. Strips 36 and 38 of which layer 32 is comprised, are deposited, or placed on the aluminum layer 30, or on the phosphor layer 28. These strips provide the electro-magnetic index signals. The signal from strip 36 is used to excite, via suitable circuitry, the red-green phosphor combination; the index signal from 38 is used to excite, via suitable circuitry, the blue-green phosphor combination. The indexing strip is "in front of" the color producing strips which it is associated so that the scanning time required for the beam to proceed from strip 36 to strip 40 is substantially equal to the overall delay that is encountered between the generation of the index signal at 36 and the time that its effect is felt at strip 40. This time delay is shown in FIGURE 2 as $T_m$. An equal delay $T_m$ is shown to exist between the indexing strip 38 and color producing strip 42. For optimum performance the period $T_m$ should be reduced to a minimum. This may be accomplished by using an electro-magnetic radiation index signal and by using a minimum number of wide band circuits.

In FIGURE 2*a* there is a cross sectional view of one configuration of the screen of FIGURE 2. The color producing phosphor strips 40, 41, 42, 43 are illustrated.

The layer 30 of electron-transparent aluminum is also shown. Indexing strips 36 and 38 are on the side of the screen intended to face the gun of the tube, corresponding to layer 32 of FIGURE 1. Strips 36 may consist of suitably prepared Hex ZnO, or $Ba_2SiO_4$ activated by lead, or by triclinic $CaMgSiO_4$ activated by cerium. When bombarded by the scanning beam the strip 36 will produce electro-magnetic radiation in the neighborhood of 3700 Angstroms. This radiation has the further characteristic of decaying very rapidly upon cessation of energization. Strip 38 may consist of a tungsten wire, or molybdenum, or other material with high atomic number that generates X-rays upon excitation by the scanning beam. X-ray production is normally encountered when the scanning beam strikes layer 30, and the phosphor strips. It is made to increase substantially when the beam strikes 38 due to the fact that the efficiency of X-ray production is proportional to the atomic number of the metal of which the target is constructed. The governing equation essentially is: Efficiency $=1.4\times10^{-9}$ ZV where Z is the atom number of the target, and V is the electron accelerating voltage. For tungsten, $Z=74$, and at 20 kv. the efficiency is approximately 0.2%. This X-radiation also decays very rapidly after cessation of energization; more so than the phosphors of which strip 36 may consist. Hence the screen of FIGURE 2*a* may be used to generate two electro-magnetic index signals which are distinguishable from each other, from the visible display, and from spurious radiations.

In the event that strip 36 also is preferred to be an X-ray emitter then it is desirable to make use of the characteristic radiation of the X-ray producing strips. Molybdenum for example, operated at 20 kilovolts will yield characteristic radiation at 0.71 and 0.63 Angstroms. By suitable filtering, in the detector or in the screen, it is possible to distinguish the continuous distribution of X-rays produced by the tungsten strip 36, from the characteristic radiation of molybdenum strip 38. If it is desired to use a plurality of strips that emit characteristic radiation it is necessary to make a selection governed by Moseley's law $f^{1/2}=K\ (Z-6)$ which states that the frequency of the characteristics radiation is proportional to the atomic number of the emitter. For example, copper has a K-radiation at 1.53 Angstroms when excited by 8 kv. electrons. At 15 kv. this radiation increases much more rapidly than the background, or continuous radiation. The method of generating these characteristic spectra, and of filtering the separate radiations, is well known to those skilled in the use of X-rays. I refer to "X-rays and Electrons" by Arthur H. Compton, 1926, published by D. Van Nostrand Company, and to "X-rays in Practise" by Wayne T. Sproull, published by McGraw Hill, 1946, Tables III, IV and V, for further particulars. Three points will be mentioned here for simplifying the understanding of this facet of the invention. First, the characteristic radiation shows up as a sharp peak in the plot of intensity versus wavelength for a particular target. Second, an excitation energy which exceeds a certain minimum is required to excite these peaks. Third, a material that is the same as the target material used in generating characteristic spectra does not have a strong affinity for absorbing such characteristic radiation.

In view of the importance of generating these signals alternate means are illustrated in FIGURE 2*b*, and in FIGURE 3*a*. In FIGURE 2*b* a mesh-like structure is formed of horizontal members 37, and vertical members 36 and 38. The interstices of this structure are filled, strip-wise, with phosphors to provide the color producing strips 40, 41, 42 and 43. Member 36 may consist of a copper wire; member 38 may consist of a molybdenum wire; many other choices exist as was just explained. The members 37 may or may not be conductive but should be substantially different from 36 and 38 insofar as X-ray producing qualities are concerned. The conductive assembly is operated at high voltage. It is clear that as the electron beam scans from left to right indexing signals will be generated. The overall time delay in the circuitry using these signals should be adjusted to $T_1$ and $T_2$, which represent periods of time akin to $T_m$ of FIGURE 2.

In FIGURE 3, a signal indexing strip 44 is shown. The signals derived from 44 will provide gating pulses for energization of the red, blue, and green phosphors. The overall time delay, between generating the index signal at 44 and energizing the first phosphor strip, is shown to be $T_M$. As was stated with respect to FIGURE 2, it is desirable to reduce the overall time delay to a minimum.

In FIGURE 3*a* a cross section of a target screen configuration is shown which will provide three different electro-magnetic index signals. Phosphor layer 28 comprises strips of color emitting phosphors; layer 30 is electron-transparent and light-reflecting; layer 32, also electron-transparent, provides continuous X-radiation, and may also provide characteristic X-radiation. A constant voltage $V_2$, is maintained at the side of the target screen opposite layer 32. A suitable voltage $V_1$, is maintained across layer 32. When the scanning beam of electrons traverses the layer 32, electro-magnetic index signals are generated at **44*a*, 44*b*, and 44*c*. The voltage $V_2$ may be applied by means of a transparent electrical coating. This coating may be applied to member 28 or to the faceplate of the tube to which it is to be positioned, or adhered. The voltage $V_1$, may be applied via member 32**.

Proceeding to FIGURE 19, the target screen 310 is maintained at the voltage introduced through lead 308. The inside of the face plate 316 is maintained at the voltage introduced through 314. Insulators 313 separate the target screen from the face plate. When the electrons from gun 302 pass through screen 310, they will be accelerated or decelerated, thereby producing electro-magnetic radiation index signals. When these signals are in the X-ray region, the interruption or change in X-radiation may be detected by coating light collecting and transmitting means 304 with a material such as zinc oxide at 305 which will radiate near or in the visible spectrum when excited by X-rays. Means 304 serves as a light pipe to transmit the radiation thus generated at 350 to photomultiplier elements 320, 324, 326, which operate in a well known manner to yield an electrical signal at 330. Means 304 may have a channel therethrough as at 307 to permit passage of the electrons from gun 302 to the target screen. Element 320 converts the radiation which is transmitted to it via 304 into electrons for subsequent multiplication by the secondary emission process. Alternatively, means 304 and the wave-changer 305, may be eliminated by having element 320 comprised of a material such as bismuth which will convert the X-radiation which impinges upon it directly into electrons.

The arrangement in FIGURE 20 provides for two internal detectors of electro-magnetic index radiation. Light pipes 350 and 352 are akin to 304 of FIGURE 19; detectors 360 and 362 are akin to 320; dynodes 364, 366, 368, are akin to 324, 326, and 328; collector plates 370 and 372 are akin to 329. Gun 354 is akin to 302. One electrical index signal is obtained from 370, the other from 372, in order to control the electron beam furnished by gun 354. This arrangement may be used with the target screen of FIGURE 2*a*. The target screen generates an ultra-violet index signal and an X-ray index signal as previously described. Accordingly, element 350 may comprise nickel-oxide glass to transmit the ultra-violet signal and element 352 may comprise fuse silica coated at 351 with zinc oxide to convert the X-radiation to a longer wave-length which is capable of being transmitted through 352. Elements 350 and 352 are positioned as shown to pick up an amount of radiation from the target screen which is substantially independent of the position on the screen of the radiating area.

Returning to FIGURE 3*a*, the signal at **44*a* is seen to occur in the following manner. Layer 32 is maintained at 20 kv. and consists of a thin layer of copper for example. When layer 32 is scanned by 20 kv. electrons a continuous spectrum, and 1.53 Angstrom characteristic radiation, are emitted. Either, or both, of these signals may be detected. The region 45 is maintained at $V_2$ a voltage substantially different from $V_1$. This may be accomplished by the transparent coating or by placing a wire grid at 45. The faceplate of tube envelope 10** may also be used to provide the grid; or construction as described in my U.S. Patent 2,885,591 may be used.

The signal at **44*b* occurs due to the removal of a strip of layer 32**. When the electron beam scans this region clearly a change in the X-radiation will be produced which is detectable.

The signal at 44, as at **44*a*, occurs due to acceleration or deceleration of the electrons. However, the layer 32 is not altered as at 44*a*, and 44*b*. This may be desirable for production purposes. When X-radiation is augmented at 47 for indexing purposes in one of the manners previously set forth it will be found that the thin, electron transparent layer 32, which is at 44*c***, will not materially attenuate these X-rays.

Another mode of operation of the target screen at **44*c*, and at 44*a***, consists of regulating the velocity change of the electrons, and the rate of the velocity change, to produce electro-magnetic signals in the Hertzian and microwave range. The frequency of these signals is controlled by $V_1$, $V_2$, and the physical distance between them. FIGURE 17 shows an antenna arrangement which may pick up these signals for further utilization.

*Index signal detector*

An arrangement is shown in FIGURE 4 which makes use of the indexing signals generated by the target screen structure of FIGURE 2. Element 50 is photon-sensitive and emits electrons in response to bombardment or energization by the electro-magnetic indexing signals. Element 52 is a filter that transmits the radiation from index strip 36, and that attenuates or stops the radiation from index strip 38, and the spurious radiations. By way of example, if strip 36 is Hex $Z_nO$ radiating at 3700 Angstroms, and strip 38 is copper radiating 1.53 Angstroms, then 52 suitably may consist of a thick layer of nickel oxide glass. This material will pass the 3700 Angstroms signal, attenuate the 1.53 Angstrom signal, and attenuate the spurious X-radiation and the spurious visible radiations. Dynodes 54, 56, 58, and 60 operate to increase the signal represented by the electron flow from element 50 by a process of secondary emission amplification. Anode 62 collects the output signal from where it is fed to gate 76. After a short time delay, furnished by element 80, the output signal is fed to gate 78. Thus the pulse-like signal generated by strip 36 will be detected by element 50, amplified, and used to operate gate 76 for the purpose of allowing the red video information to modulate the intensity of the electron beam. The cumulative time delay in excitation and transmission of the electro-magnetic index signal; in transmission of the electron signal through the dynodes, gate, and to the gun of the cathode ray tube; and in the passage of the intensity modulated electron beam from the gun to the target screen, is substantially equal to the period $T_M$ designated in FIGURE 2. Element 80 delays the output signal obtained at 62 for a time equal to that which the scanning beam takes in traversing the red strip 40. This delayed signal operates gate 78 for the purpose of allowing the green information to modulate the intensity of the electron beam. It is clear that in this manner proper color synchronization is obtained. A second photon-sensitive secondary-emission detector-amplifier and gate arrangement are required but not illustrated to operate the blue-green phosphor combination. Likewise, the method and means for deriving the video information are not illustrated as being unnecessary for understanding of the present invention. Element 52 in the second detector-amplifier combination may suitably consist of a relatively thick layer of copper. This layer 52 clearly will pass the 1.53 Angstroms characteristic copper radiation; will attenuate the 3700 Angstroms signal emitted by index strip 36; and will attenuate spurious visible radiation.

*Regenerative Detector*

It is of interest now to control the delay and the shape of the pulses that operate the gates. This may be achieved conventionally by delay lines, multi-vibrators, blocking oscillators, biased amplifiers, biased gates, etc. The arrangement of FIGURE 4 is novel for the purposes herein intended. A fast decay phosphor deposit 64 is excited by the leading edge of the detected and amplified iexnd signal. Light pipe 66 provides feedback to element 50 to produce a positive feedback signal. Very rapidly a saturated output signal is obtained at anode 62. A negative going signal is obtained from the output of gate 76, or from a delay line akin to 80, which is coupled to dynode 58 via capacitor 82. This negative going signal interrupts the positive feedback path, terminates the output pulse, and the detector-amplifier is ready to receive a new trigger signal. Element 64 may consist of Hex $Z_nO$. Element 66 may consist of fused silica. The time constants are adjusted in consequence of the pulse width desired. The first dynode 54 may be a grid structure akin to that used in vacuum tube triodes and by means of voltage source 70 may be adjusted to control the threshold of operation so that the incident electro-magnetic index signal must exceed a minimum value before the triggering signal is effective. Variable voltage source 72 may be used to control the overall delay through the dynodes. Variable resistor 74 may be used to control the amplitude of the output signal. Since these controls are inter-dependent, they may be ganged together mechanically after initial adjustment to provide for convenient system readjustment by the operator or technician. Thus, there is provided a fast rise-time pulse generator which responds to the leading edge of the index signal, which responds to a definite index signal level, and which yields an output pulse of fixed width and amplitude. Additionally, if it is desired, the sweep or scanning voltages may be applied to the control elements of this pulse generator to compensate for fixed distortions in the electron beam deflection system.

*Modulation of the video signals*

In FIGURE 5 a base line 84 may be considered to represent distance along the target screen of FIGURE 3 in the direction of the horizontal scan. Pulses 86, 88, and 90 represent in an ideal fashion the excitation of the scanning beam on a target screen. The pulses may be derived from arrangements such as those just described. The intervals from 0 to 6T represent equal time periods. The intervals also represent the widths of the color phosphor strips as shown. When the scanning beam traverses the screen with constant velocity from 0 to 3T the pulses 86 are equally spaced and preferably centered in each interval of space. When the scanning velocity is not constant, or when the pulse delays introduce error, as shown from 3T to 6T, the pulses 86 are advanced to the positions shown by pulse 90, or retarded to the position shown by pulse 88. The pulse width is shown equal to "*t*" which in this case is approximately T/3. The non-linearity illustrated is *t*, or T/3, for each time period 3T. The errors resulting from non-linearity of scan are cumulative for the time between successive indexing pulses. Therefore, the pulse first derived from the indexing pulse is shown to have a small shift between 3T and 4T, the second derived pulse is shown to have a larger shift between 4T and 5T, and the last derived pulse is shown with the largest shift between 5T and 6T.

The illustration in FIGURE 6 teaches how the pulse first derived from the indexing pulse may be made of greater duration than the pulse last derived while still maintaining color purity. This is due to the fact that the accumulated errors of scan position are much less for the first derived pulse. For the example cited the excitation period may be increased from *t* to 2⅓*t*. Since the red phosphor is least efficient it is clear that doubling the excitation period of this strip is of considerable consequence; and this is achieved without increasing the width of the red strip.

The illustration in FIGURE 7 teaches still another method of improved utilization of variable pulse and phosphor widths and spacings. Here it is clearly shown that by increasing the width by 33% of the strip which is excited by the pulse last derived from the index pulse it is possible to increase the period of excitation of that strip by 100% and still preserve color purity.

Taking these last two features in combination makes it possible to make effective use of 60% of the target screen area even in the presence of a 10% non-linear scan. This can be achieved by using pulse widths of 2⅓*t*, 1⅔*t*, and 2*t* (a total of 6*t*) on the target screen of FIGURE 7 where, for example, the red strip may have a width of 3*t*, the blue strip 3*t*, and the green strip a width of 4*t* (making a total of 10*t*). As a generality then, advantage is obtained in broadening the excitation interval at the start of a pulse train and making the latter derived excitation intervals successively more narrow; and in successively broadening the width of the individual strips in the direction of scan so that the strip to be excited by the initial pulse in a given train is relatively narrow in comparison to these which are to be excited by pulses which follow in the train. Clearly these arrangements efficiently utilize (1) the scanned area of a cathode ray tube and (2) the emission current of the CRT gun.

The illustration in FIGURE 8 shows that the duration of the target excitation pulse may be modulated within the interval 0 to T, making it possible to use a constant intensity scanning beam. Each color video signal modulates the duration of the beam within each respective color strip so that the duration of excitation is proportional to the magnitude of the information to be presented. The use of a constant intensity scanning beam is of considerable value in maintaining uniform focus and spot size of the beam. Clearly a combination of intensity modulation and duration modulation of the beam may also be used to advantage.

The pulse shapes illustrated in FIGURES 5, 6, 7, and 8 are rectangular. These pulses represent the idealized excitation of the target screen. In practice distortion of the idealized excitation is to be expected. The passage of a rectangular pulse through delay lines, gates, transmission lines, etc., can be expected to distort the original pulse. This distortion, which is correctable, is a function of the original pulse width and shape, and of the bandwidth of the circuits through which the pulse travels. It is also a function of the design of the electron gun. In FIGURE 9 a distorted wave shape is illustrated that might result from passing a rectangular pulse through circuits with inadequate bandwidth. By use of shaping circuits, Schmitt triggers, blocking oscillators, multivibrators, etc., it is possible to reshape or restore the distorted waveform so that its effect is lessened. The leading edge of a distorted pulse is shown at 96, the trailing edge at 92. By biasing at 94 it is possible to re-create a rectangular pulse with a duration "*t*."

*Control of the scanning beam*

Another source of distortion of the idealized excitation results from the sape of the scanning beam. An electron beam that is circular in cross section will have a variation in density of electrons measured across a diameter that may be represented by curve 96 in FIGURE 10. Were a scanning beam of this shape to scan and energize a strip that emits indexing radiation it is clear that something less than a rectangular pulse of indexing radiation would be obtained. The extent to which this distortion is detrimental depends upon many factors and may or may not be serious. I have disclosed previously the use of an index radiation generating strip that has an output whose magnitude saturates upon excitation; I also disclosed that the output of the pulse generator may saturate in amplitude. Both of these modes of operation will reduce the distortion caused by the scanning process. Referring back to FIGURE 4, and the explanation thereof, it is seen that the distortion may be still further reduced by using the leading edge of the index radiation pulse to trigger a pulse generator. The stability of this leading edge is of prime importance in this mode of operation. When the scanning beam is intensity modulated the effect of an increase in intensity upon the beam dimensions, or upon its effect, is illustrated at 98 in FIGURE 10. When this situation prevails the effect is the same as advancing, in time, the leading edge of the index radiation pulse. This will result in jitter of the index pulses that is a function of the amplitude modulation of the scanning beam. One method of reducing this jitter is to provide an index strip that is scanned by a beam whose characteristics are held constant during scanning of the index strip. Another method is illustrated in FIGURE 13.

To explain FIGURE 13, reference should first be made to FIGURES 19 and 20. Deflection plates 318 and 319 of FIGURE 19 and 356, 358 of FIGURE 20 akin to 22 and 20 of FIGURE 1 may be incorporated and utilized when it is desired to vary the shape and position of the electron beam in the cathode ray tube. For example, the horizontal scanning velocity in a color television system using substantially vertical strips of phosphorescent materials may be regulated so that the effective time during which the electron beam impinges on a particular strip or strips is considerably longer than would be permissible with a uniform, horizontal scanning velocity. The set of plates orthogonal, or nearly so, to those imparting the variations in horizontal velocity may be incorporated and utilized when it is desired to elongate the electron beam in a direction substantially parallel to the aforementioned strips. For equal horizontal and vertical resolution in a color kinescope, of the type considered, it is possible to increase the length of the electron beam transversely of its horizontal travel, or parallel to the "vertical" phosphor strips, by a factor of the order of 3.1 without adversely affecting the ultimate resolution. Furthermore, due to the anticipated correlation in the picture bright areas it is possible to increase this ratio still further without suffering an undue loss of resolution. These last set of deflecting plates may be utilized so that the spot stretch is controlled by the picture content at the point, or area, in question.

The arrangement of FIGURE 13 is responsive to an index pulse. The index pulse may be derived, for example, from the detector-amplifier of FIGURE 4 and may be used to control the excitation of the target screen of FIGURE 2. Pulse 106 is provided by means 110; pulse 108 is provided by means 112. Pulse 106 is first derived from the index pulse and is made to have a greater duration than pulse 108 which is later derived. Pulse 106 operates gate 76 which releases the red video signal. This gated signal in turn furnishes a positive going pulse of voltage to the grid 100 of gun 12. The greater the red video signal the more positive becomes grid 100 so that the red phosphor strip 40 of FIGURE 2 will be energized in an amount proportional to the magnitude of the red video signal. Simultaneously the index pulse is delayed and shaped in means 112 to provide a pulse 108 to operate the green gate 78 which in turn releases the green video signal to intensity modulate the electron beam furnished by gun 12. The pulses 106 and 108 are fixed in amplitude, and rectangular in shape. The gated video signals will drive the grid 100 more positive to intensity modulate the beam 114. To reduce the spread of the beam 114 when its intensity is increased, plates 20 are made positive via connection 116 by the gated video signals. These plates 20 may be in the path of the beam as shown or may be part of anode 104. In the latter event anode 104 would be built in segmented fashion. The positive pulses on plates 20 will stretch beam 114 in the direction perpendicular to the horizontal scan; this direction is parallel to the phosphor strip long dimension. This stretching will reduce the spread of beam 114 in the horizontal direction. Should this horizontal spread still be excessive, plates 22 are utilized. These plates are also in the vicinity of gun 12 and are connected to retard the velocity of scan in the horizontal direction when horizontal beam spread occurs. The retardation signal is equal to or proportional to the amplitude of the gated video signals, and thus will cancel the effects of horizontal beam spread insofar as the timing of the leading edge is concerned. This will reduce leading edge jitter and provide a more stable electro-magnetic index signal.

For the arrangement of FIGURE 13 to provide a modulation similar to the type illustrated in FIGURE 8, the means 110 and 112 are selected to provide triangular pulses 118 and 120, or additional pulse shaping elements are added. The triangular pulses are suitable coupled to the gates. Then, not only will the intensity of beam 114 be increased when the gated video signals increase, but the time duration of the beam will increase. This is illustrated in FIGURE 13*a* where a video signal level 122 makes the electron beam effective for a brief interval whereas a stronger video signal makes the electron beam effective for an interval 124. The advantage gained here is that of reducing the intensity variations, and therefore the focus variations, in the beam 114 from that required with constant duty-cycle energization of the phospher strips. Other methods for converting variable amplitude information into variable pulse-width information are well known and therefore not described. When using this type of modulation it may be desirable to provide an index strip which is energized by a constant intensity scanning beam. This fixed beam may be obtained by known means.

*Reducing the time delay*

Coming to another aspect of this invention, the overall time delay, and distortion, in the feedback loop comprising the gun, the target screen, the electro-magnetic radiation, the detector, the amplifier, the gate, and back to the gun, is reduced in the arrangement of FIGURE 14 from that achievable in FIGURE 4 or 13. Also the gate is eliminated. The gun 12 provides an electron beam 114. Vernier deflection plates 20 and 22 may be used for the purposes just described. The target screen provides a plurality of indexing radiations; one for each color strip to be excited and controlled. A three color producing screen is selected for illustrative purposes. The three index radiation generators are symbolized in FIGURE 11 at 130, 132, and 134. Three index radiation gatherers are shown at 136, 137, and 138. These elements transmit the proper index radiation to means which detect the radiation to provide an electrical signal, which is amplified, and modulated to furnish output signals for modulating the beam 114 in accordance with the video information that is to be viewed on the target screen. Three index radiation filters are symbolized in FIGURE 12. Filter 131 attenuates or reflects the radiation from generators *b* and *c*, but passes that from generator *a*. Filter 133 attenuates the radiation from generators *a* and *c*, but passes that from generator *b*. Filter 135 attenuates the radiation from generators *a* and *b*, but passes that from generator *c*. These filters are used in conjunction with the index radiation gathering, transmitting, or detection means to properly synchronize the overall operation. For example, element 136 picks up the index radiation that is to be associated with the energization of the red phosphor strip. This radiation is transmitted through 142 to means 140. Photo-sensitive means 144 provides a group of electrons in response to excitation by the index radiation.

Elements 144, 146, and 148 are arranged to operate as a heaterless vacuum triode. The emission from 144, the spacing of 146, and 148, and the voltages impressed thereon are selected to provide a space charge in the region between 144 and 146. Design details familiar to vacuum tube designers can be applied here for construction purposes. The red video signals are applied to grid 146 to control the passage of electrons from 144 to 148. Plate or anode 148 collects the thus controlled electron flow. Plate 148 is unlike an ordinary triode, however, in that it also behaves as a dynode and emits secondary electrons. Further stages of secondary emission amplification follow such as at 150. The output signal is collected at 156 to furnish a negative going pulse signal, 158, to the cathode of the gun 12. The time delays are arranged so this pulse signal controls the energization of the red phosphor strip. Voltage 158 may also be fed to plates 22 to retard the leading edge of the index radiation pulse for reasons described previously. To control incrementally the horizontal scan rate it is desirable to use also the positive output 160 from element 154 so that the signal on plates 22 will be push-pull. The output from 154 may also be used for spot stretch as described previously. Means similar to 140 are symbolized in FIGURE 14 for exciting the blue and green color producing phosphor strips.

Instead of introducing the red control voltage as a video signal at 141 it is possible to use deflection plates 152 to obtain synchronous demodulation of the carrier signal and it is otherwise possible to use direct decoding of carrier type signals but this goes beyond the teachings of the instant invention and will not be discussed further.

In FIGURE 15 means 170 combines the three detector-amplifier-modulators of FIGURE 14 into a single device. Elements 174, 176, and 178 are akin to elements 143, 145, and 142, respectively. Element 204 is akin to 144. Control grid 190 is akin to control grid 146. Dynodes 200 and 196 are akin to 148 and 150, respectively. Output plate 198 is akin to 156. Elements 206 and 208 furnish electron groups in response to the excitation by radiation of the green and blue index strips respectively. Member 202 provides optical and electrical shielding. Member 192 is a control grid that is connected to the green video signals. This grid 192 regulates the passage of electrons from 206 to plate 200. Likewise 194 is a control grid that is connected to the blue video signals. This grid 194 regulates the passage of electrons from 208 to plate 200.

The operation of means 170 follows from the description of operation of FIGURE 14. Three electro-magnetic index signals are generated, collected, filtered, and brought to impinge upon three different photon-sensitive electron-emitting surfaces. Each index signal and electron-emitting surface is associated with a different color producing phosphor. Each electron-emitting surface furnishes a copious supply of electrons which are space charge limited. A control grid is provided for each supply of electrons. Each grid is connected to its associated color video signal to control the passage of these electrons. The electrons are passed in individual groups, sequentially, and are amplified by a series of dynodes. The amplified and controlled electron group are combined in the dynode stage to provide a series of signals as the output.

It is to be noticed that the successive dynodes may be reduced in physical size, as depicted, to reduce associated capacitances, to increase the potential frequency response of the output signals, and to help match element 198 to its transmission line. Thus, the output plate 198 of means 170 conveniently feeds into a coaxial cable 172. The coaxial transmission line carries the series of signals to the cathode ray tube for modulation of the scanning beam contained therein. The scanning beam excites the target screen. Electro-magnetic index signals are generated, and the process continues.

The advantages gained in simplicity of construction and in performance are numerous. For example, the time delays and distortions may be reduced from the arrangement of FIGURE 14. Still additional significant advantages occur by constructing the gun 12, in FIGURE 15, of the cathode ray tube in planar fashion, with coaxial input connections at 210, and with a resistor at 212 which effectively matches the impedance of coaxial transmission line 172. Thereby a reflection-less termination for the output of means 170 may be provided. This arrangement clearly provides for improved transmission and utilization of very short pulses. Resistor 212 may be cylindrical or annular. Alternatively, the internal impedance between the grid cathode may terminate the transmission line. Elements 214 are illustrated to indicate that means similar to plates 20 and 22 may also be used.

*Wide-band cathode ray tube*

The construction of FIGURE 15 also draws attention to the fact that the conventionally heated cathode of gun 12 of the cathode ray tube may be eliminated. Plate 198 may be fabricated to be secondary emissive. With this arrangement the plate 198 may yield the electrons normally furnished by cathode 218. Grid 220 of gun 12 may also be dispensed with, since the output at 198 is properly modulated; i.e., its amplitude is proportional to the intensity of the image point to be displayed. The dotted outline of a tube envelope 230, and deflection coils 216, are shown to symbolize this mode of operation. Although not shown, it is clear that the pulse generator of FIGURE 4 may be incorporated into the embodiment of FIGURE 15 to provide pulses of saturated space charged clouds of electrons which are then grid controlled by the video signals.

The arrangement of FIGURE 15 that yields the heaterless cathode is illustrated more clearly in FIGURE 21. Two of the index signal paths are shown. The numeration of elements in FIGURE 21 akin to those in FIGURE 15 remain the same.

*Radiation collectors*

In FIGURE 16 a lens 250, a cone-shaped member 252, and a hollow cone 254 are illustrated. These devices may be used to pick up and transmit electro-magnetic index radiation in the range from infra-red to ultra-violet. Flat fresnel type lenses may also be used. In FIGURE 17 a lens 256 with a hole therethrough, and a rod 258, are devices that may be used for the same purpose. Rod 258 may be solid; if hollow it may be made of metal. Antenna 260 is connected to a coaxial transmission line 262 and may be used to extend the range of index radiations, that are picked up and transmitted to microwave and to Hertzian waves. To extend the range of signals that may be picked up into the X-ray region members 250, 252, 254, 256, or 258 may be coated with a material, such as Hex $Z_nO$, as described heretofore.

In FIGURE 18 electro-magnetic radiation gatherers 250 are shown affixed to the electron source 12 of the cathode ray tube. Any of the pick-up elements may be so affixed.

*Summary*

Thus, it has been shown and described how a plurality of electro-magnetic index signals may be generated that indicate the position of a scanning beam on a directed ray tube. A plurality of means are disclosed for synchronizing the energization of the scanning beam with the target screen upon which it impinges. A plurality of means are disclosed for modulating the scanning beam; this modulation being directed towards presenting information on the target screen, and being directed towards insuring proper synchronization. In combination with these features are additional means that reduce the time delay in system synchronization and means that increase the band width handling capabilities of cathode ray tubes.

It is to be stated that although this invention is described in a color television display system it is not limited thereto. The use of the word color encompasses other than visible radiations in a proper interpretation of this invention. Many electro-magnetic radiations may be used, it being clear that each radiation may serve as a separate communication or control channel. In the case of radiation in the visible range optical techniques for filtering the radiations are well known; in the microwave, or Hertzian, range electrical filtering techniques are also well known; in the X-ray region techniques for producing and filtering monochromatic radiation are likewise well known. In addition to the Compton and Sproull references already cited, I also refer to "Applied X-Rays," by Clark, McGraw Hill, 1955. The wide range of signals, that may be utilized constitutes one advantage of this invention. It is also to be noted that these teachings can be applied to storage-type devices, to projection tubes, to digital signal generators, to quantizers, etc. In applications utilizing the scanning of a beam relative to a target where high speeds, high definition, wide band widths, and minimum distortions are required, this invention provides its greatest advantages.

Having thus described my invention, I claim:

1. A beam-index multi-color display system comprising:

(1) a target screen having a plurality of different color-emitting regions disposed for scanning in sequence by a scanning beam;

(2) index-signal source means responsive to the scanning of the target screen for providing an indication of the position of the beam on said screen;

(3) color signal source means;

(4) signal processing means, responsive to (a) the color signals and (b) to the index signals, for controlling the scanning beam so as to properly excite the color-emitting regions;

said scanning beam, target screen, index-signal source means, and signal processing means having an inherent overall time delay;

(5) means for precisely controlling the time delay to effectuate registry of the scanning beam on selected color-emitting regions, and (6) scanning beam modulating means in the signal processing means, responsive to the magnitude of the different color signals, for elongating said beam in proportion to the intensity of the particular color signal to be displayed.

2. The system of claim 1 including a cathode ray tube which provides the target screen and an electron gun for furnishing the scanning beam.

3. The system of claim 1 wherein said target screen comprises means for generating electromagnetic radiation index signals.

4. The system of claim 1 wherein said index-signal source means comprises means for detecting electromagnetic radiation index signals.

5. The system of claim 3 wherein said index signals are in the X-ray region of the spectrum.

6. The system of claim 1 wherein the time delay is equal to the time required for the scanning beam to traverse two adjacent color-emitting regions.

7. The system of claim 1 wherein the time delay is less than the time required for the scanning beam to traverse two adjacent color-emitting regions.

8. The system of claim 2 wherein said target screen comprises color-emitting strips disposed vertically with respect to the horizontal scanning action of the electron beam; including means for scanning the electron beam across the target screen; and wherein the scanning beam modulating means comprises a pair of electrodes for stretching the electron beam in a vertical direction.

9. The system of claim 8 including means for coupling the color signals, applied to the control grid electrode of the electron gun, to the pair of electrodes for stretching the electron beam.

10. A high-speed beam-index multi-color display system comprising:

(1) a target screen having a plurality of different color-emitting regions disposed for scanning in sequence by a scanning beam;

(2) index-signal source means responsive to the scanning of the target screen for providing non-sinusoidal pulse-like index signals indicative of the position of the beam on said screen;

(3) color signal source means;

(4) signal processing means, responsive to (a) the color signals and (b) to the index signals, for modulating the scanning beam into a sequential train of pulses, each pulse thereof generally having a duration which is less than the time required for the beam to traverse the strip with which the pulse is associated;

said scanning beam, target screen, index-signal source means, and signal processing means having an inherent overall time delay which is a small part of a line scansion;

(5) means for precisely controlling the time delay to effectuate proper registry of the pulses of the scanning beans on the color-emitting regions, and (6) scanning beam modulating means in the signal processing means, responsive to the magnitude of the different color signals, for increasing the duration of pulses in said train of pulses in proportion to the intensity of the particular color signal to be displayed.

11. The system of claim 10 including a cathode ray tube which provides the target screen and an electron for furnishing the scanning beam.

12. The system of claim 10 wherein said target screen comprises means for generating electromagnetic radiation index signals.

13. The system of claim 10 wherein said index-signal source means comprises means for detecting electromagnetic radiation index signals.

14. The system of claim 12 wherein said index signals are in the X-ray region of the spectrum.

15. The system of claim 10 wherein the time delay is equal to the time required for the scanning beam to traverse two adjacent color-emitting regions.

16. The system of claim 10 wherein the time delay is less than the time required for the scanning beam to traverse two adjacent color-emitting regions.

17. The system of claim 10 wherein the color-emitting regions are narrow strip-like elements disposed so as to be scanned substantially at right angles to the long dimension.

18. The system of claim 10 wherein the signal processing means modulates the pulses of the scanning beam into a series of non-sinusoidal rectangular-like time varying pulses.

19. The system of claim 10 wherein the signal processing means for modulating the scanning beam into a sequential train of pulses comprises means, responsive to the different color signals, for elongating the scanning beam in proportion to the intensity of the particular color signal to be displayed.

20. The system of claim 1 including means in the signal processing means for modulating the scanning beam into a sequential train of pulses so that pulses thereof have a duration in time proportional to the intensity of the particular color signal to be displayed.

References Cited by the Examiner

UNITED STATES PATENTS

| | | | |
|---|---|---|---|
| 2,434,196 | 1/1948 | Cawein | 315—14 |
| 2,458,891 | 1/1949 | Boyle | 315—31 |
| 2,784,342 | 3/1957 | Van Overbeek | 178—5.4 |
| 2,930,931 | 3/1960 | Aiken | 315—31 |

DAVID G. REDINBAUGH, *Primary Examiner.*

J. A. O'BRIEN, *Assistant Examiner.*